United States Patent [19]

Spranger

[11] 4,225,439
[45] Sep. 30, 1980

[54] APPARATUS FOR SELECTIVE SEPARATION OF MATTER THROUGH SEMI-PERMEABLE MEMBRANES

[75] Inventor: Kurt Spranger, Ammerbuch-Entringen, Fed. Rep. of Germany

[73] Assignee: Gambro Dialysatoren GmbH & Co. KG, Fed. Rep. of Germany

[21] Appl. No.: 951,313

[22] Filed: Oct. 13, 1978

[30] Foreign Application Priority Data

Oct. 17, 1977 [SE] Sweden .................... 7711631

[51] Int. Cl.² .......................................... B01D 31/00
[52] U.S. Cl. .......................... 210/321 R; 210/321 B; 55/158; 422/48
[58] Field of Search ........... 210/321 A, 321 R, 321 B, 210/433 M, 456, 323 T, 340, 341; 55/158; 422/48

[56] References Cited

U.S. PATENT DOCUMENTS

| 2,686,154 | 8/1954 | MacNeill | 210/321 B |
|---|---|---|---|
| 3,778,369 | 12/1973 | Markley | 210/321 |
| 3,993,816 | 11/1976 | Baudet et al. | 210/321 R |
| 4,038,190 | 7/1977 | Baudet et al. | 210/321 B |
| 4,054,527 | 10/1977 | Esmond | 210/321 B |
| 4,125,468 | 11/1978 | Joh et al. | 210/321 B |

FOREIGN PATENT DOCUMENTS

| 2514763 | 10/1975 | Fed. Rep. of Germany | 210/321 A |
|---|---|---|---|
| 434947 | of 1974 | U.S.S.R. | 210/321 B |

Primary Examiner—Thomas G. Wyse
Assistant Examiner—David R. Sadowski
Attorney, Agent, or Firm—Lerner, David, Littenberg & Samuel

[57] ABSTRACT

Apparatus for selectively separating matter between a first fluid and a second fluid through semi-permeable membranes. The apparatus comprises frame means defining first and second contact zones, each of which is in turn comprised of first and second contact chambers. A plurality of tubular semi-permeable membranes are disposed in each of the contact chambers. Each of the tubular membranes has an inlet end and an outlet end, and is adapted to conduct a least a portion of a first fluid from the inlet end to the outlet end. Barrier means are provided between the first contact zone and the second contact zone for preventing fluid communication therebetween. Fluid communication means are provided in each of the contact zones for providing fluid communication between the first contact chamber and the second contact chamber of each of the contact zones so that fluid in each of the contact zones flows substantially throughout both the first and second contact chambers thereof around a plurality of tubular membranes. Inlet means are provided for the second fluid for distributing the second fluid between the first and second contact zones and for introducing a portion of the second fluid into each of the contact zones. Outlet means are provided for withdrawing the second fluid from each of the contact zones after the second fluid is conducted substantially throughout the first and second contact chambers. Sealing means are provided for sealing the plurality of tubular membranes from the contact chambers so that there is no contact between the first fluid and the second fluid.

11 Claims, 3 Drawing Figures

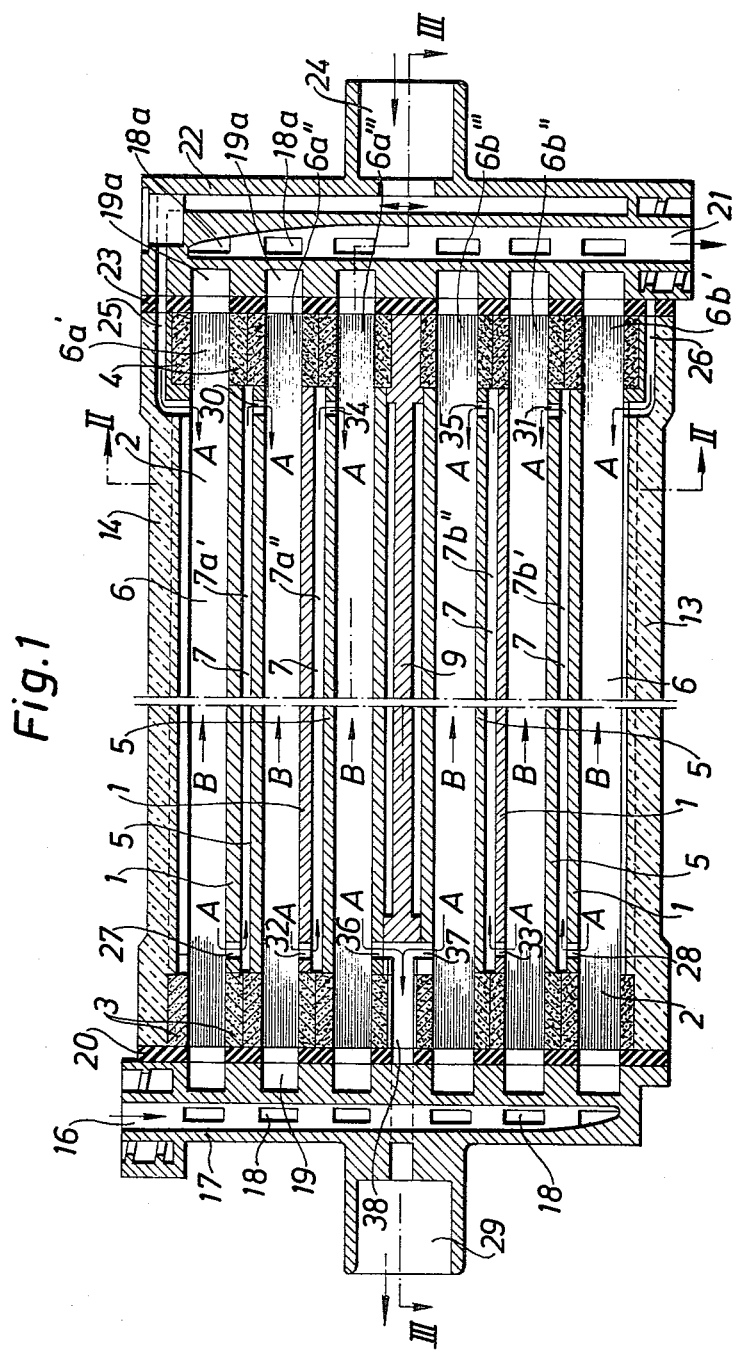

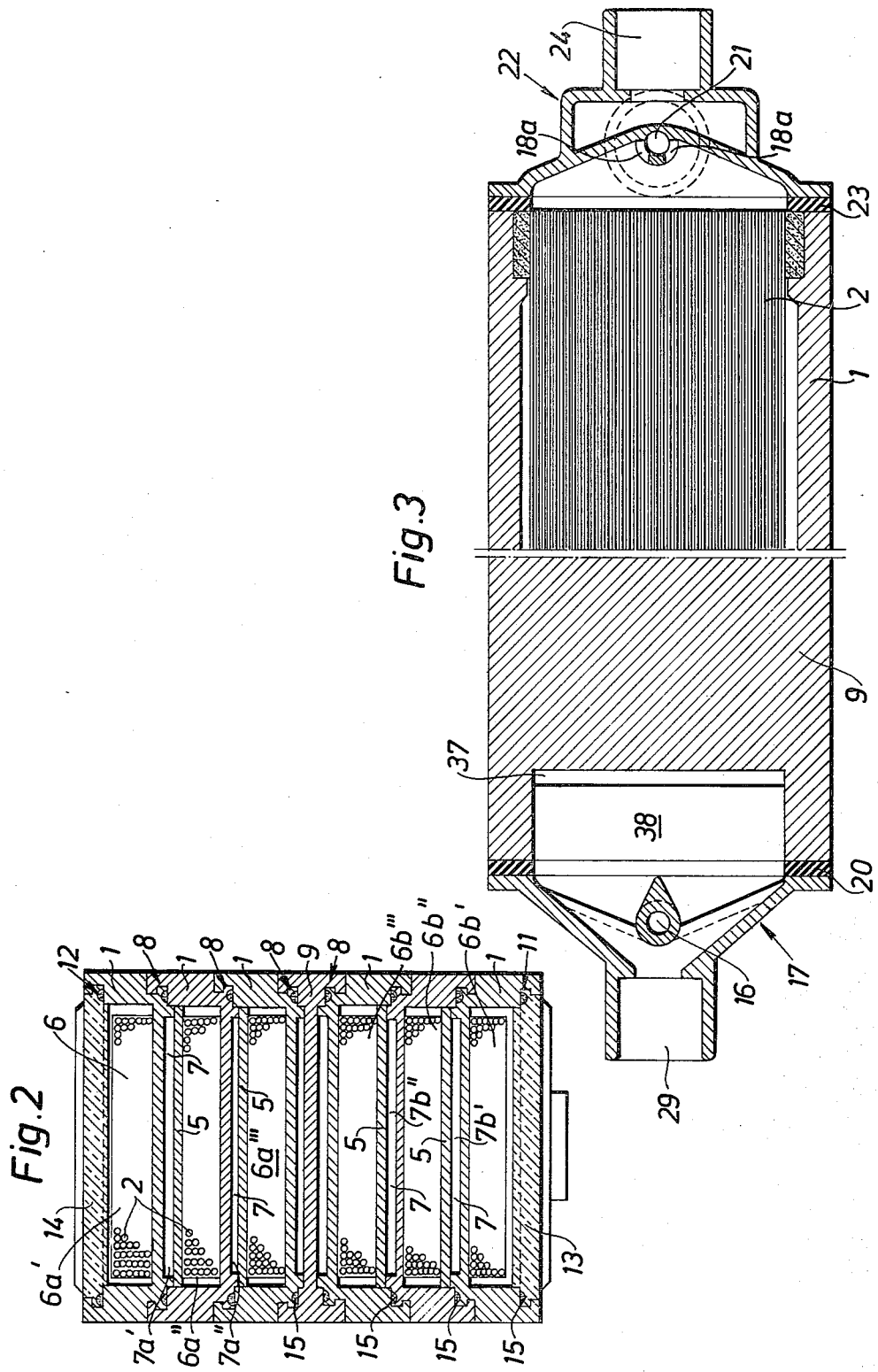

APPARATUS FOR SELECTIVE SEPARATION OF MATTER THROUGH SEMI-PERMEABLE MEMBRANES

BACKGROUND OF THE INVENTION

The present invention relates generally to apparatus for selectively separating matter between two fluids utilizing semi-permeable membranes, and more particularly, to apparatus in which the membranes have the shape of thin walled tubes through which one of the fluids is intended to flow. Still more particularly, the present invention relates to such an apparatus in which the tubes are surrounded on their outer surface by the other fluid, and in which collective inlets and outlets are provided for the respective fluids.

It has been known in the past to utilize semi-permeable membranes to facilitate the diffusion and/or filtration of matter between two fluids therethrough. For example, such membranes are particularly useful in artificial kidney devices for blood purification, as well as in diafiltration and ultrafiltration devices. From patents such as U.S. Pat. Nos. 3,728,256 and 4,038,190 as well as other patents, it is known to utilize arrangements in which a plurality of tubular semi-permeable membranes are provided in two or more separate chambers connected to one another. In such arrangements, the first fluid passes through the semi-permeable membranes and the second fluid is arranged to pass through the separate chambers around the outer surface of the tubular membranes to selectively separate the matter between the first fluid and the second fluid through the membranes.

The search has, however, continued for improved devices for selective separation of matter between fluids. In particular, the search has continued for such devices which are suitable for mass production while at the same time maintain and/or improve the good flow conditions of the respective fluids which are characteristic of such known devices. Further, the search has continued for devices which improve the effectiveness of the separation of matter between the two fluids.

SUMMARY OF THE INVENTION

In accordance with the present invention, these and other objects have been achieved by providing an apparatus for selective separation of matter between a first fluid and a second fluid. In particular, the apparatus according to the present invention includes frame means defining first and second contact zones, each of the contact zones being comprised of first and second contact chambers. A plurality of tubular semi-permeable membranes are disposed in each of the contact chambers. These tubular semi-permeable membranes each have an inlet end and an outlet end, and are adapted to conduct at least a portion of the first fluid from the inlet end to the outlet end. Barrier means are provided between the first and second contact zones for preventing fluid communication therebetween. Each of the first and second contact zones further includes fluid communication means for providing fluid communication between the first contact chamber and the second contact chamber of each of the contact zones so that fluid in each of the zones flows substantially therethroughout around the plurality of tubular membranes. Inlet means are provided for the second fluid for distributing the second fluid between the first and second contact zones and for introducing a portion of the second fluid into each of the first and second contact zones. Outlet means are provided for withdrawing the second fluid from the contact zones after it has been conducted therethrough. Sealing means are provided for sealing the plurality of tubular membranes from the contact chambers so that there is no contact between the first fluid and the second fluid.

With such an apparatus, the second fluid is split or divided so as to flow along two substantially similar paths in contact with the semi-permeable membranes through which the first fluid is adapted to flow. Each of these two paths for the second fluid comprise at least two contact chambers. As a result, the effectiveness for the selective separation of matter is substantially improved compared with prior constructions in which substantially all of the second fluid is conducted through each of the contact chambers in which the tubular semi-permeable membranes are disposed. This improved effectiveness is due primarily to the fact that the active distance that a given amount of the second fluid flows is limited compared to the active distance that the second fluid flows in similar sized known prior art constructions wherein by and large the entire quantity of second fluid passes through each of the contact chambers in which the tubular membranes are disposed.

In the preferred embodiment, the first and second contact chambers are each defined by separate frame assemblies which are stacked in side by side relationship. In this way, a construction suitable for mass production is achieved.

In a further preferred embodiment of the present invention, the first and second frame assemblies defining first and second contact chambers are each supported on a common supporting plate which serves as the barrier means separating the first and second contact zones. This common supporting plate may be arranged centrally between the two groups of stacked frames in order to provide for compact structure.

In a still further preferred embodiment, intermediate flow channels are defined between the adjacent frame assemblies in each of the first and second contact zones so that a pure countercurrent flow of the second fluid with respect to the first fluid flowing through the tubular membranes may be obtained in both the first and second contact zones. This serves to further improve the separation effectiveness achieved with the apparatus of the present invention, as noted in copending U.S. application Ser. Nos. 713,408 filed Aug. 11, 1976.

These and other advantages of the present invention will be apparent from the following detailed description in which reference is made to the enclosed drawings which illustrate the preferred embodiment of the present invention.

BRIEF DESCRIPTION OF THE DRAWINGS

FIG. 1 is a longitudinal sectional view of the apparatus in accordance with the present invention;

FIG. 2 is a sectional view taken along lines 2—2 of FIG. 1; and

FIG. 3 is a sectional view taken along lines 3—3 of FIG. 1.

DETAILED DESCRIPTION OF THE PREFERRED EMBODIMENT

Turning now to the drawings in which like reference characters represent like elements, there is shown generally an apparatus for selective separation of matter through semi-permeable membranes. The apparatus in accordance with the present invention is intended mainly for use as an artificial kidney for obtaining blood purification. The present invention will therefore be described in the following with reference to such a use of the apparatus. However, it will be clear to those versed in the art that the construction of the apparatus of the present invention can also be used for processes other than the dialysis of patients suffering from kidney disease. For example, it may be used for similar processes such as diafiltration or ultrafiltration. With such other uses, one of the inlets for one of the fluids may be omitted if desired. Further still, the present invention may be used in connection with the treatment for failure of the liver, pancreas, and other organs. Still further, the apparatus in accordance with the present invention may be used as an oxygenizer wherein one of the fluids consists of blood while the other consists of oxygen or an oxygen mixture.

Accordingly, in the description herein, selective separation of matter is used to designate any of the processes referred to hereinabove, and in particular, to encompass the processes of diffusion, ultrafiltration, and/or diafiltration. Further, fluid is intended in its broad sense to encompass both gases as well as liquids.

As best seen in FIGS. 1 and 2, the apparatus of the present invention comprises a plurality of frame assemblies 1 each of which contain a cluster or mass of thin walled tubes or fibers 2. The fibers 2 are preferably thin walled tubes which consist appropriately of fibers with capillary flow ducts. However, larger dimensions for the thin walled tubes are also possible. The tubes 2, as best seen in FIG. 1, have their ends cast into blocks 3, 4 of sealing compound, e.g., polyurethane. The frame assemblies 1 are designed to retain these blocks 3, 4 of sealing compound at the opposite ends thereof with the tubes 2 extending therebetween. Preferably, the tubes or fibers 2 are placed in tension when supported in the frame assemblies 1. Such an arrangement is useful to maintain the individual tubes 2 apart from one another to allow the second fluid which is to be conducted therearound to completely surround the outer surfaces of each of the tubes 2.

The frame assemblies 1 each define a contact chamber 6 through which the active part of the fibers 2 passes. As best seen in FIG. 2, each of the individual frame assemblies 1 are U-shaped in cross section to define the contact chamber 6 between the opposite sides thereof. Individual frame assemblies 1 are arranged in stacks, one on top of the other, with removable plates 5 disposed between adjacent frame assemblies 1. The frame assemblies 1, as best seen in FIG. 2, are provided with a web interconnecting the two sides thereof and which, with the removable plates 5, define an intermediate flow chamber or channel 7 which are intended for the return flow of the second fluid as more fully described hereinbelow. It is to be noted that the intermediate flow chambers 7 do not have any thin walled fibers or tubes 2 disposed therein; the tubular membranes 2 are only disposed in the contact chambers 6.

Each of the frame assemblies 1 is preferably of an elongated and substantially rectangular shape. Consequently, the assembled apparatus will have a substantially parallelepipedic shape which is most suitable from a point of view of storage and transport, both of the frame assemblies 1 before assembly and of the completely assembled apparatus of the present invention.

The frame assemblies 1 are interconnected to one another by means of flexible connectors 8 which snap together to interconnect adjacent frame assemblies 1. Similar flexible snap connectors 8 are provided on an intermediate barrier or carrier plate 9 to which the individual frame assemblies 1 are connected on opposite sides. Further, similar snap devices 11 and 12 are provided which secure a bottom cover plate 13 and a top cover plate 14 along the upper and lower outer surfaces of the stacked frame assemblies 1. As best seen in FIG. 2, these flexible connectors 8, 11, and 12 are formed so as to be integral with the corresponding frames so that no special means of attachment are required. This thus reduces the number of component parts required and therefore provides for ease in manufacture, and assembly of the selective separation apparatus of the present invention.

Gasket seals 15 are provided between each of the individual frame assemblies 1, between the individual frame assemblies 1 and the intermediate carrier plate 9, and finally, between the individual frame assemblies 1 and the upper and lower cover plates 13 and 14. The gasket seals 15 thus serve to seal the contact chambers 6 and intermediate flow chambers 7 of the frame assemblies 1 from the open ends of the tubular membranes 2.

The frame assemblies 1 are divided into two groups each of which are connected to the common supporting plate 9. Preferably, the supporting plate 9 is arranged centrally between the two groups of stacked frame assemblies 1 so as to facilitate assembly and construction of the apparatus, and also to provide a compact arrangement for the completed apparatus of the present invention.

The stacked frame assemblies 1 mounted on the supporting plate 9 are provided with first and second end fittings 17 and 22. These end fittings 17 and 22 contain the inlets and outlets for at least one of the fluids, and preferably for both of the fluids. In this way, the individual frame assemblies 1 can be given their simplest possible form.

In the preferred embodiment, the end fittings 17 and 22 contain the inlets and outlets for both of the respective fluids. If the device is to be used for the dialysis of blood, the blood comprises the first fluid and is supplied via an inlet 16 located in the end fitting 17. From the inlet 16, the blood is passed via appropriate openings 18 to a number of individual distributing chambers or ducts 19 and from there into the open ends or mouths of the thin walled tubes or fibers 2. The blood is then conducted through the tubes or fibers 2 in the direction marked with the arrows B in FIG. 1 towards the end fitting 22 at the opposite end of the stacked frame assemblies 1. At the end fitting 22, the blood is withdrawn via appropriate individual collecting chambers or ducts 19a and conducted through openings 18a which communicate with an outlet 21. The collecting chambers or ducts 19a and the openings 18a in end fitting 22 are similar in nature to the distributing ducts and openings 19 and 18 provided in end fitting 17.

Appropriate sealing gaskets 20, 23 are provided between the sealing blocks 3 and 4 and the end fitting 17 and 22 of each of the frame assemblies 1. These sealing gaskets 20, 23 surround and seal the plurality of tubular membranes 2 of each of the frame assemblies 1 from one another so that the open ends of the plurality of tubular membranes of each frame assembly 1 communicate with only one duct 19 or 19a. This arrangement serves to evenly distribute the first fluid or blood to each of the pluralities of tubes or fibers 2.

The second fluid or dialysis liquid is introduced into the apparatus via an inlet 24 in the end fitting 22 and is distributed via two ducts 25, 26 arranged in the upper and lower cover plates 14, 13 respectively, and from there, into first contact chambers 6a' and 6b', respectively. From these chambers 6a', 6b', the dialysis liquid, as indicated by the arrows A in FIG. 1, passes in a direction purely countercurrent to the direction of flow of the first fluid or blood passing through the tubular membranes 2. The dialysis liquid is conducted first through the chambers 6a', 6b' in a direction towards the end fitting 17. From there, the dialysis liquid, as indicated by arrows A, passes via openings 27, 28 respectively, into the intermediate flow chambers 7a' and 7b'. The dialysis liquid is then conducted according to a pattern as indicated by the arrows A via openings 30-37 to a central duct 38 in the supporting carrier plate 9. From there, the dialysis liquid is conducted to the outlet 29 located in the end fitting 17.

With such an arrangement as shown, a pure countercurrent flow is achieved between the blood flowing through the tubular membranes in a direction of the arrows B (i.e., from the first end fitting 17 to the second end fitting 22) and the dialysis liquid flowing either through the contact chambers 6a', 6a", 6a''' in the contact zone above the carrier plate 9 or through the chambers 6b', 6b", 6b''' in the contact zone below the carrier plate 9. In other words, the second fluid or dialysis liquid is divided initially and is conducted through separate contact zones each of which is comprised of a series of contact chambers. In each of the contact chambers, the dialysis liquid is caused to flow in only a countercurrent direction with respect to the first fluid flowing through the intermediate flow chamber. This is the result of intermediate chambers 7a', 7a", and 7b', 7b", which are arranged between adjacent contact chambers 6a', 6a", 6a''' and 6b', 6b", 6b'''. The intermediate webs of the frame assemblies 1 and the removable plates 5 are each provided with appropriate openings 25-37 arranged to facilitate this pure countercurrent flow between the two fluids. While these fluid communication openings 25-37 are shown as holes in the webs and the plates 5, the webs and plates 5 could simply terminate a short distance from the blocks of sealing compound 3 or 4, such as for example as shown in copending U.S. application Ser. No. 713,408.

The end fittings 17 and 22 can be secured to the stack of frame assemblies 1, the cover plates 13, 14 and the intermediate carrier plate 9 in any optional well known manner. For example, this could be accomplished by means of gluing, welding, or with suitable snap interconnecting devices.

Thus, it is seen that according to the apparatus of the present invention, the second fluid is divided and caused to flow into two separate non-interconnected zones so as to limit or reduce the effective flow path that such liquid flows along in order to provide for a more effective selective separation of matter between first and second fluids via semi-permeable membranes. Furthermore, it is seen that the apparatus according to the present invention is suitable for mass production in that the apparatus is comprised of separate similar components which are stacked and joined together. This facilitates the production of different sized selective separation apparatus without the necessity of requiring separate manufacturing apparatus for each of the different sizes. In this regard, it is to be noted that each of the frame assemblies 1 and plates 5 are identical to each of the other frame assemblies 1 and plates 5.

Accordingly, in accordance with the present invention, there is provided apparatus for selective separation of matter between first and second fluids through semi-permeable membranes. The apparatus comprises frame means defining first and second separate contact zones and a barrier means 9 preventing fluid communication between the first and second contact zones. Each of the contact zones includes first and second contact chambers in each of which a plurality of tubular semi-permeable membranes 2 are disposed. The semi-permeable membranes 2 are adapted to conduct a first fluid therethrough, whereas the contact chambers 6 are adapted to conduct the second fluid around the semi-permeable membranes. Inlet means 24, 25, 26 are provided for distributing the second fluid between the first and second contact zones and for introducing the second fluid into at least one of the contact chambers 6a', 6b' of each of the first and second contact zones. Fluid communication means are provided in each of the contact zones for providing fluid communication for the second fluid between the contact chambers 6 thereof so that the portion of the second fluid in each of the contact zones is substantially conducted throughout the contact chambers 6 in each zone. Outlet means 38, 29 are provided for withdrawing of the portion of second fluid in each of the contact zones after conduction through the contact chambers 6. Furthermore, sealing means 3, 4, 15, 20, 23 are provided for sealing the semi-permeable membranes from the contact chambers so that there is no contact between the first and second fluids.

While the preferred embodiment of the present invention has been described and shown, it will be understood that such is merely illustrative and that changes may be made without departing from the scope of the invention as claimed. Thus, the individual details shown may vary within wide limits without exceeding the cope of the invention. For other similar types of construction containing other details which could be applied to the construction of the apparatus in accordance with the present invention, reference should be made to copending U.S. patent application Ser. Nos. 951,312 and 951,314 filed on even data herewith.

What is claimed is:

1. Apparatus for selectively separating matter between a first fluid and a second fluid through semi-permeable membranes, said apparatus comprising:

frame means defining first and second contact zones, each of said contact zones having a first end and a second end and being comprised of first and second contact chambers;

a plurality of tubular semi-permeable membranes disposed in each of said contact chambers, each of said tubular membranes having an inlet end and an outlet end and adapted to conduct at least a portion of said first fluid from said inlet end to said outlet end;

barrier means between said first contact zone and said second contact zone for preventing fluid communication therebetween;

fluid communication means in each of said contact zones for providing fluid communication between said first contact chamber and said second contact chamber of each of said contact zones so that the fluid in each of said contact zones flows substantially throughout both said first and second contact chambers of said contact zones around said plurality of tubular membranes therein, said fluid communication means including an intermediate flow chamber between said first and second contact chambers and said intermediate flow chamber communicating with said first contact chamber at said second end and with said second contact chamber at said first end;

inlet means for said second fluid for distributing said second fluid between said first and second contact zones and for introducing a portion of said second fluid into said first contact chamber of each of said contact zones at said first end thereof so that said portion of said second fluid introduced into said contact zone flows through each of said contact chambers in a direction from said first end to said second end and through said intermediate flow chamber in a direction from said second end to said first end;

outlet means for withdrawing said second fluid from each of said contact zones after said second fluid has been conducted through said first and second contact zones; and sealing means for sealing said plurality of tubular membranes from said contact chambers so that there is no contact between said first fluid and said second fluid.

2. The apparatus of claim 1 wherein said frame means comprises first and second frame assemblies for each of said first and second contact zones, said first frame assembly defining said first contact chamber, and said second frame assembly defining said second contact chamber; and wherein said intermediate flow chamber is defined by an intermediate wall of said first frame assembly and a separate intermediate plate between said first frame assembly and said second frame assembly, said intermediate wall having an opening at said second end for said second fluid and said intermediate plate having an opening at said first end for providing for communication between said intermediate flow chamber and said second contact chamber.

3. The apparatus of claim 2 wherein said barrier means comprises a common supporting plate and wherein said apparatus further includes mounting means for mounting said frame assemblies of said first contact zone on one side of said common supporting plate and for mounting said frame assemblies of said second contact zone on the opposite side of said common supporting plate.

4. The apparatus of claim 3 wherein said mounting means comprises first and second cover plates between which are disposed said common supporting plate and said frame assemblies of said first and second contact zones and means for clamping said first and second cover plates together with said common supporting plate and said frame assemblies therebetween.

5. The apparatus of claim 4 wherein said means for clamping comprise flexible connectors on said frame assemblies and on said common supporting plate for interconnecting together adjacent frame assemblies and for interconnecting to said common supporting plate at least one of said frame assemblies of each of said contact zones.

6. The apparatus of claim 2 wherein each of said frame assemblies includes inlet means for said first fluid and outlet means for said first fluid.

7. The apparatus of claim 6 wherein said inlet means for said first fluid is at said second end of said contact zone and wherein said outlet means for said first fluid is at said first end of said contact zone so that said first fluid is conducted through said tubular membranes in a direction counter to the direction of flow of said second fluid through said first and second contact chambers and in the same direction as said second fluid flows through said intermediate chamber.

8. The apparatus of claim 7 wherein said sealing means comprises inlet seal means for sealing said inlet means for said first fluid from said contact chambers and said intermediate chambers and outlet seal means for sealing said outlet means for said first fluid from said contact chambers and said intermediate chambers.

9. The apparatus of claim 8 wherein said inlet and outlet sealing means include means between each of said individual frame assemblies for sealing said contact chambers from said inlet and outlet means for said first fluid when said individual frame assemblies are stacked together.

10. The apparatus of claim 7 further including first and second end fittings for said first and second ends of said frame assemblies mounted on said common support plate, said first end fitting including said outlet means for said first fluid and said second end fitting including said inlet means for said first fluid.

11. The apparatus of claim 10 wherein said inlet means for said second fluid is in said first end fitting and wherein said outlet means for said second fluid is in said second end fitting.

* * * * *